United States Patent
Tsai et al.

(10) Patent No.: US 8,013,744 B2
(45) Date of Patent: Sep. 6, 2011

(54) RADIO FREQUENCY IDENTIFICATION (RFID) SURVEILLANCE TAG

(75) Inventors: Han-Chung Tsai, Darien, IL (US); Yung Y. Liu, Hinsdale, IL (US)

(73) Assignee: UChicago Argonne, LLC, Chicago, IL (US)

( * ) Notice: Subject to any disclaimer, the term of this patent is extended or adjusted under 35 U.S.C. 154(b) by 371 days.

(21) Appl. No.: 12/426,054

(22) Filed: Apr. 17, 2009

(65) Prior Publication Data

US 2010/0033323 A1    Feb. 11, 2010

Related U.S. Application Data

(60) Provisional application No. 61/086,698, filed on Aug. 6, 2008.

(51) Int. Cl.
*G08B 13/14* (2006.01)

(52) U.S. Cl. ............. 340/572.8; 340/572.1; 340/539.31; 340/693.5; 235/439

(58) Field of Classification Search .... 340/572.1–572.8, 340/539.31, 693.3, 693.5, 693.9; 235/492, 235/439
See application file for complete search history.

(56) References Cited

U.S. PATENT DOCUMENTS

| | | | |
|---|---|---|---|
| 5,222,399 A | | 6/1993 | Kropp |
| 5,640,151 A | | 6/1997 | Reis et al. |
| 5,936,523 A | * | 8/1999 | West .......................... 340/545.6 |
| 6,043,746 A | * | 3/2000 | Sorrells ....................... 340/572.7 |
| 7,079,832 B2 | | 7/2006 | Zalewski et al. |
| 7,372,366 B2 | * | 5/2008 | Lyon et al. ................. 340/572.8 |
| 7,492,254 B2 | | 2/2009 | Bandy Shu et al. |
| 7,701,346 B2 | * | 4/2010 | Lindsay et al. ............ 340/572.3 |
| 7,839,289 B2 | * | 11/2010 | Chung et al. ............... 340/572.8 |

* cited by examiner

*Primary Examiner* — Anh V La
(74) *Attorney, Agent, or Firm* — Joan Pennington (57) ABSTRACT

An enhanced method and apparatus are provided for tracking and managing a plurality of packagings, particularly packagings containing radioactive and fissile materials. A radio frequency identification (RFID) surveillance tag is provided with an associated packaging. The RFID surveillance tag includes a tag body and a back plate including predefined mounting features for mounting the surveillance tag to the associated packaging. The RFID surveillance tag includes a battery power supply. The RFID surveillance tag includes a plurality of sensors monitoring the associated packaging including a seal sensor. The seal sensor includes a force sensitive material providing a resistivity change responsive to change in a seal integrity change of the associated packaging. The resistivity change causes a seal integrity tag alarm. A tag memory stores data responsive to tag alarms generated by each of the plurality of sensors monitoring the associated packaging.

20 Claims, 7 Drawing Sheets

FIG. 9 ical Industries. Passive# RADIO FREQUENCY IDENTIFICATION (RFID) SURVEILLANCE TAG This application claims the benefit of U.S. Provisional Application No. 61/086,698 filed on Aug. 6, 2008.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to an improved method and apparatus for tracking and managing a plurality of packagings, particularly packagings containing radioactive and fissile materials.

DESCRIPTION OF THE RELATED ART

Management of multiple, such as thousands of packagings of radioactive and fissile materials, in storage, transportation and disposal is a serious challenge for United States Department of Energy (DOE) to ensure accountability, safety, security, worker and public health, and protection of the environment. Many know arrangements for inventory and quality control typically utilize paper and file systems, resulting in labor-intensive operations and often less-than-effective data management.

U.S. Pat. Nos. 5,640,151 and 5,686,902 to Reis et al., and assigned to Texas Instruments Incorporated, disclose a communication system for identifying, locating, tracking and communicating for other purposes with large numbers of tags in a time and energy efficient manner. The tags are associated with items located in a communication region that is interrogated by an interrogator on a one-to-many basis using broadcast commands, on a one-to-one basis using directed commands or on a combination basis using both methods. Identification occurs through organized transmission and reception of signals between the tags and the interrogator. A batch collection protocol uses a combined one-to-many and one-to-one communication system that effectively resolves communication contentions. The batch collection protocol employs a plurality of collection periods, which communicate with large or unknown numbers of portable tags.

Radio frequency identification (RFID) is one of today's most rapidly growing technologies in the automatic data collection industry. RFID technology allows objects to be automatically identified by means of radio waves. An RFID system generally consists of tags and readers. The tags are attached to the objects to be identified, and the reader communicates with the tags through radio waves. Examples of pervasive RFID applications are traffic toll collection, access control, cargo container monitoring for the military, and inventory control in the pharmaceutical industries. Passive RFID tags, which do not contain an onboard power supply or environmental sensor capabilities, are often used to replace barcode labels in retail, pharmaceutical, and military environments.

Principal objects of the present invention are to provide an improved method and apparatus for tracking and managing a plurality of packagings, particularly packagings containing radioactive and fissile materials.

Important aspects of the present invention are to provide such method and apparatus substantially without negative effect and that overcome some of the disadvantages of prior art arrangements.

SUMMARY OF THE INVENTION

In brief, an improved method and apparatus are provided for tracking and managing a plurality of packagings, particularly packagings containing radioactive and fissile materials. A radio frequency identification (RFID) surveillance tag is provided with an associated packaging. The RFID surveillance tag includes a tag body and a back plate including predefined mounting features for mounting the surveillance tag to the associated packaging. The RFID surveillance tag includes a battery power supply. The RFID surveillance tag includes a plurality of sensors monitoring the associated packaging including a seal sensor. The seal sensor includes a force sensitive material providing a resistivity change responsive to change in a seal integrity change of the associated packaging. The resistivity change causes a seal integrity tag alarm. A tag memory stores data responsive to tag alarms generated by each of the plurality of sensors monitoring the associated packaging.

In accordance with features of the invention, the RFID surveillance tag is adapted for extended use in an environment of radioactive and fissile materials.

In accordance with features of the invention, the seal sensor has no active components, and its operation exerts essentially no load on the battery power supply.

In accordance with features of the invention, the battery power supply includes multiple batteries, and a battery management function to extend the service period between battery changes. For example, the RFID surveillance tag includes four A-size Li—$SOCl_2$ batteries are installed, with only one battery activated at any time. The battery management function monitors a current battery being used, and automatically switches to a next battery when the current battery is discharged.

In accordance with features of the invention, a low battery status sensor triggers a warning responsive to a low-battery state for the operator to take action. The tag memory is non-volatile so that a low-battery state will not result in a loss of data.

In accordance with features of the invention, the back plate includes a predefined shape selectively provided for mounting with the associated packaging, and the tag body includes a universal form for use with multiple different types of the associated packaging. The selected configuration of the back plate enables simple modifications to provide different configurations and packagings. To reduce the likelihood of unintentional bumping and impact during handling of drums, the RFID surveillance tag has a slim profile that fits within the footprint of a drum cover of the associated packaging.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a radio frequency identification (RFID) surveillance tag is provided to supplement existing safeguard measures and provide real-time alarm when preset thresholds are exceeded. Active RFID surveillance tags of the invention are distinct from passive RFID tags as they are equipped with an onboard power supply as well as sensors for monitoring environmental conditions and other critical parameters, such as the status of seals and object movement.

Advantages of the application of active RFID surveillance tags of the invention in nuclear materials management are enhanced safety and security, reduced need for manned surveillance, real-time access of status and history data, and overall cost-effectiveness. The RFID surveillance tags of the invention are adapted to provide adequate resistance to radiation and battery life under service conditions that include storage and transportation of radioactive materials containers.

Figure 1:
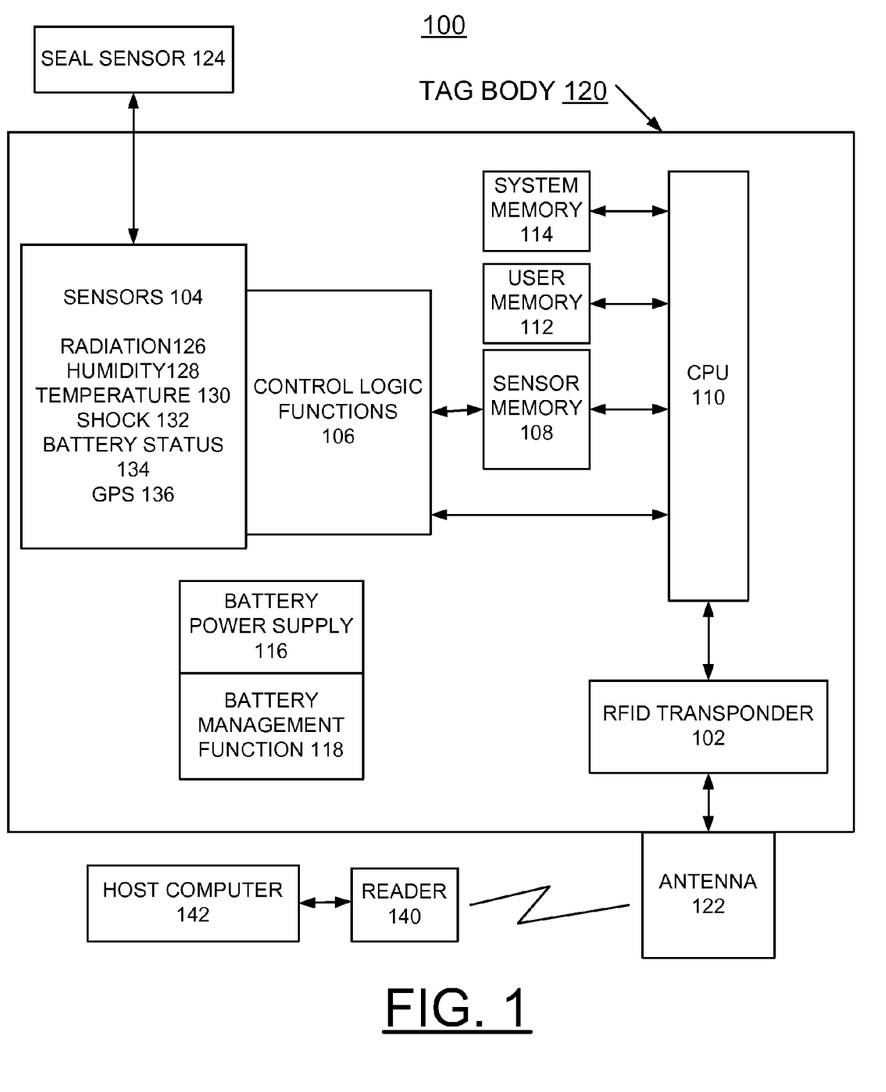
FIG. 1 is a schematic and block diagram representation of an exemplary radio frequency identification (RFID) surveillance tag in accordance with the preferred embodiment.

Having reference now to the drawings, in FIG. 1 there is shown an exemplary RFID surveillance tag of the invention generally designated by the reference character 100. RFID surveillance tag 100 includes an RFID transponder 102, a plurality of sensors 104 and control logic functions 106 coupled to a sensor memory 108 and a central processing unit 110. A user memory 112, and a system memory 114 are connected to the CPU 110. The CPU 110 is connected to and operatively controls the RFID transponder 102. RFID surveillance tag 100 includes a battery power supply source 116 including a battery management function 118 in accordance with the preferred embodiment. RFID surveillance tag 100 includes a tag body 120 or housing 120 further illustrated and described with respect to FIGS. 3, 4, 5, and 9. RFID surveillance tag 100 includes an antenna 122, such as a patch antenna 122, for example, as further illustrated and described with respect to FIG. 5, that optionally is wider and longer than the tag body 120.

Figure 3:
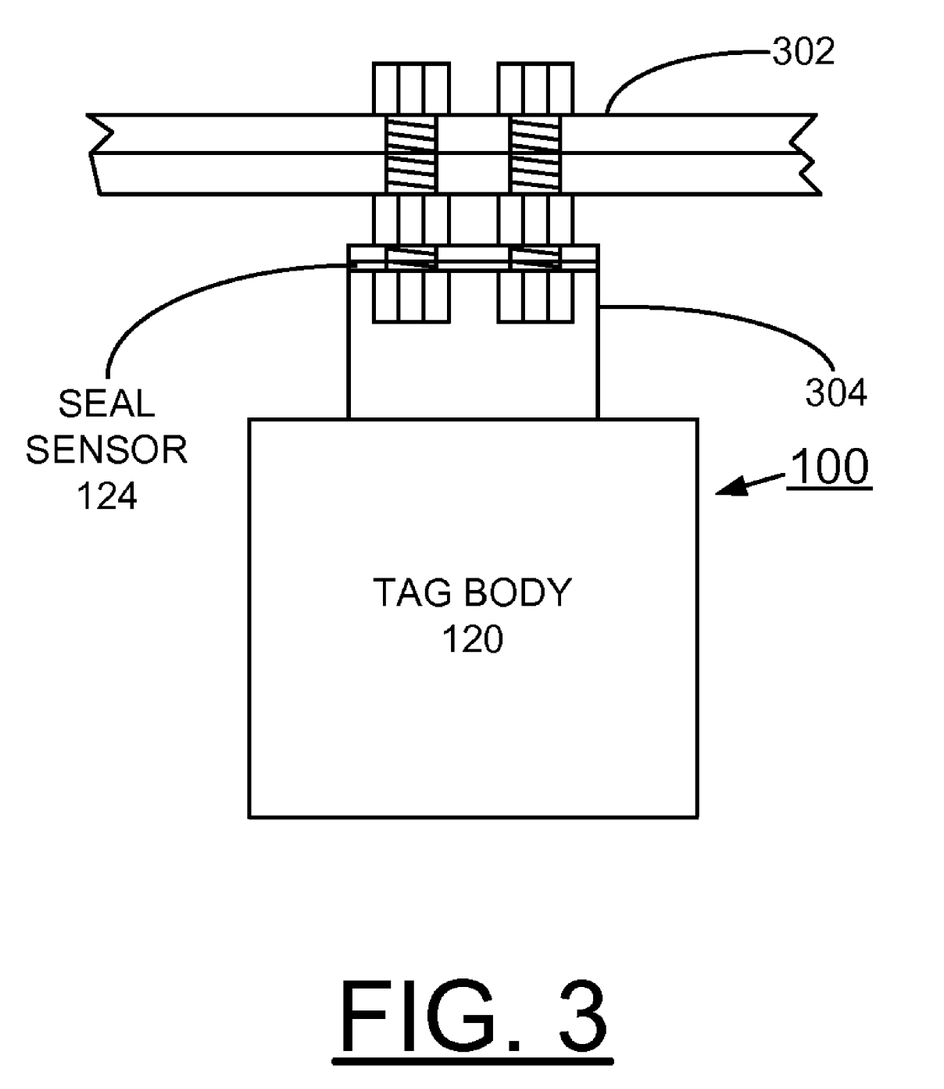
FIG. 3 schematically illustrates not to scale an example radio frequency identification (RFID) surveillance tag of FIG. 1 mounted on an associated packaging, for example, containing radioactive and fissile materials in accordance with the preferred embodiment.

In accordance with features of the invention, the multiple sensors 104 of the RFID surveillance tag 100 includes a seal sensor 124 to ensure safety, security, and life cycle management of an associated fissile material packaging, such as a fissile material packaging 302, for example, as further illustrated and described with respect to FIG. 3. The seal sensor 124 is adapted for bolt attachment to an associated fissile material packaging, such as a fissile material packaging 302 with a supporting back plate, such as supporting back plate 304 illustrated and described with respect to FIG. 3.

U.S. Pat. No. 5,222,399 to Kropp issued Jun. 29, 1993 discloses a load washer comprising a pair of thin metal washers between which a contact sensor is positioned. The contact sensor includes pairs of confronting electrodes at a plurality of spaced zones with a pressure sensitive resistive material between each pair, which, under pressure, provide an indication of the force applied to the load washer. The seal sensor 124 advantageously is implemented with a load washer and contact sensor as disclosed in U.S. Pat. No. 5,222,399.

The subject matter of the above-identified U.S. Pat. No. 5,222,399 is incorporated herein by reference.

The multiple sensors 104 of the RFID surveillance tag 100 optionally further includes a radiation dosimeter sensor 126, a humidity sensor 128, a temperature sensor 130, a shock sensor 132, a battery status sensor 134, and a global positioning sensor (GPS) 136. The condition of low-battery status detected by battery status sensor 134 triggers a warning for the operator to take action to replace the battery power supply 116. The humidity sensor 128, temperature sensor 130, and shock sensor 132 can be implemented with temperature, humidity, and shock sensors of the type available in a commercially available device ST-676, manufactured and sold by Savi Technology Corporation. See http://www.savi.com/index.shtml. By a judicious selection of the trip points, these sensors 128, 130, 132 provide valuable data to the surveillance effort during all operational phases of nuclear materials management. For instance, the threshold of shock sensor 132 may be set high for the drum transport, and reset low for the storage to trigger an alert with the slightest movement. Because all sensor actions are recorded in memory 108, a life-long history is automatically created for every associated drum and is instantly retrievable by the operator. A compact radiation dosimeter sensor 126 is provided for the RFID surveillance tag 100.

Radio frequency identification (RFID) transponder 102 advantageously is used for automatic data collection with the RFID surveillance tag 100 because it is not an optical technology, no inherent line of sight is required between a reader 140 and a tagged RFID object. In addition, the RFID tags 100 transmits data wirelessly and is a read-write technology, so RFID tags 100 can update or change the data encoded in the tag 100 during the tracking cycle. The reader 140 can be implemented with a Signpost SR-650 reader including ultra-high frequency, 433 MHz operations so that the tags 100 can be read up to 90 m away in line-of-sight. Using the Signpost low frequency, 123 kHz operations that primarily serves as a portal, the tags 100 have a read range up to 2.5 m. Both ranges can be reduced by adjusting the RF power level. A potential application of this feature is confining the RF communication inside a predefined region, for example, a portion of a vault or a truck, to enhance security.

An application software resident on a host desktop or hand-held computer 142 consisting of three key components: a Graphical User Interface, a feature set, and an underlying software architecture, is provided with the RFID system including multiple RFID surveillance tags 100. The host computer 142 with the resident computer software receives signals from the readers 140 and the tags 100 filters the data for duplicate or erroneous reads, applies rules-based business logic, and presents the data to the user in an easy-to-understand way. The user is also able to control and program the readers and the tags by sending commands to them through the software. For example, the software can allow the user to change sensor thresholds on a tag or to modify beaconing rates. The software can also store the information in a database for archiving or sharing the information with remote users through a secure network. Once set up, the software can work with the readers and the tags autonomously, requiring no human intervention.

Host computer 142 includes a user-friendly Graphical User Interface to present all relevant information in an intuitive way on the console screen (not shown) so that the user can take immediate actions based on the information presented. The user should be able to retrieve all pertinent information easily by instructions provided with a few mouse clicks. For example, the user can click on a specific region in a display to zoom in and, when a drum status becomes abnormal, the symbol turns to yellow (warning) or flashing red (alarm). As the drums may be stacked in storage, the user can select and view the stacked drums in the side-view pane on the right of the screen. By clicking on a drum, the detailed information of the drum, including its environmental conditions and battery status, is displayed in a pop-up window. Also the display includes a current status pane, a history event pane, and a search pane.

Host computer 142 includes a feature set capable of monitoring thousands of drums simultaneously. If the status of any drum becomes abnormal, the software will bring the user's attention to the situation immediately by triggering an alarm, which, depending on facility provisions, could be a siren, flashing lights, and/or signals sent to the responsible protective force. At the console (not shown), the operator or security personnel will see a flashing red symbol on the screen, with the cause of the alarm highlighted. The software also provides a convenient interface for the user to send commands to the readers 140 and the tags 100. These commands include changing the alarm thresholds of the environmental sensors, resetting the alarm state after the corrective actions, updating the drum locations after movements, reading the history file from the tag memory, and searching for specific drums. Some command functions are only available to a system administrator for security and logistic reasons.

Host computer 142 includes software that automatically records in the computer database all the information retrieved from the tags 100 and commands sent to the tags 100. It also routinely reads the inventory and history files from the tag memory and compares them to the record in the database to guarantee data integrity. The database can be made compatible to the existing systems at each storage site. Privileged remote users can access the data through a secured network. A search function is extremely useful for the inventory management, especially when the size of the inventory is large. This ability allows the operator instant access to information of all packagings that fit the search criteria. The software supports multiple search functions on criteria such as the drum ID, originating site, originating date, arrival dates, and materials stored. In laboratory tests, the search function performed as expected and located the subject drums instantaneously. Authorized system administrators can readily customize the search functions. The search function and the information registered in the tags provide a powerful basis for a statistical sampling strategy regarding the facility's materials surveillance program for the contents in the drums.

Host computer 142 includes prototype software that is written in Microsoft Visual C# and developed for the Microsoft .NET framework. The forward-looking design of the software provides excellent computing performance, lowers the future maintenance effort and cost, and reduces the vulnerability of the software and computers to security threats. The software employs multi-thread technology that is able to handle a large quantity of tags simultaneously and respond to multiple RFID events instantly.

In accordance with features of the invention, optionally when no RF operation is taken, the tag 100 is in a sleep mode. When the tag 100 is polled by the reader 140 and initiates an RF operation, RFID surveillance tag 100 goes through a cycle of three stages. The first is the wake-up stage, which takes 4 to 5 seconds. The second is the operating stage, during which the real operation, such as querying sensors, memory read/write and status transmission, and the like, takes place. This stage usually lasts less than 1 second. The third is the back-to-sleep stage, which takes about 30 seconds. As the current drain is modest in all three stages, a set of four batteries could last more than 10 years if the polling frequency is no more than once or twice daily.

Figure 2:
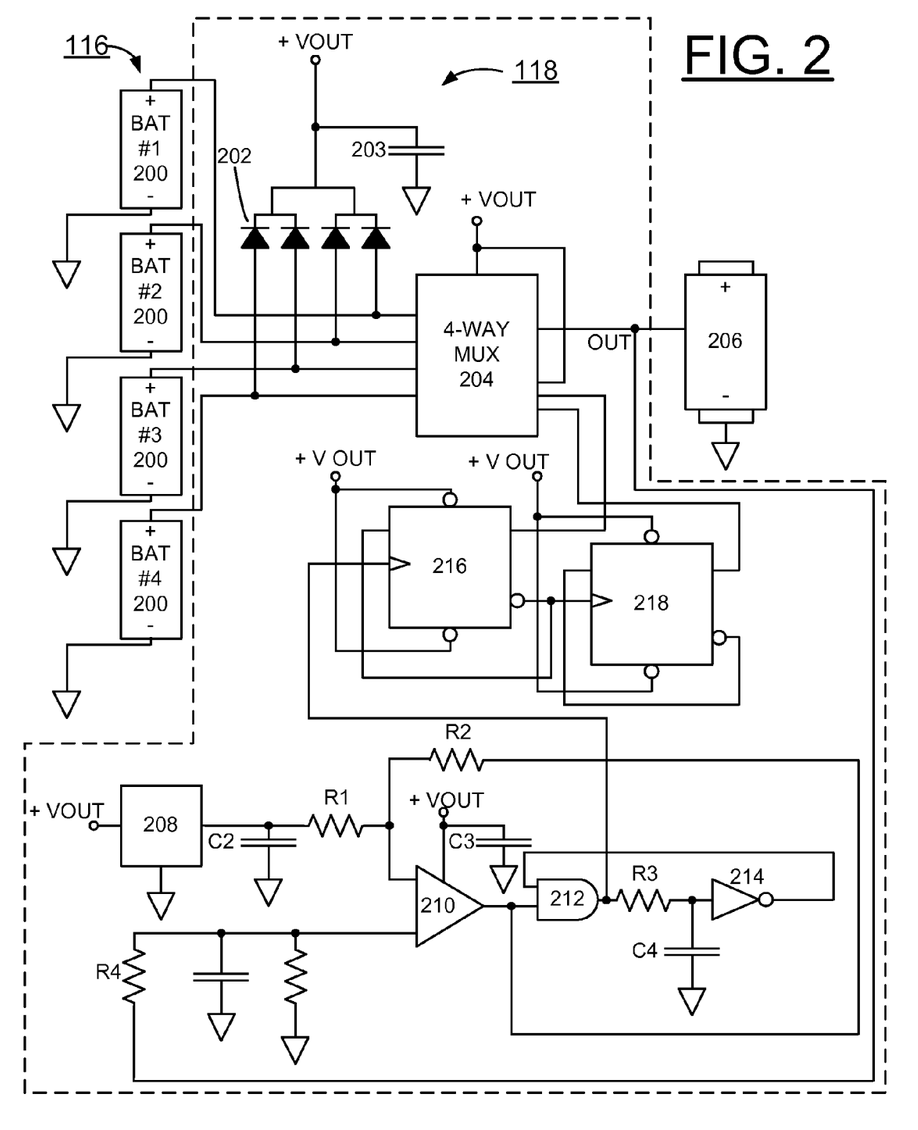
FIG. 2 is a schematic and block diagram representation of an exemplary battery power supply and battery management function of the radio frequency identification (RFID) surveillance tag of FIG. 1 in accordance with the preferred embodiment.

FIG. 2 illustrates an exemplary battery power supply 116 and battery management function 118 of the radio frequency identification (RFID) surveillance tag 100 in accordance with the preferred embodiment. The battery power supply 116 includes a plurality of parallel batteries 200, BAT #1-#4, such as four A-size Li—$SOCl_2$ batteries, managed by the battery management function 118 providing a smart switching circuit. For example, only one battery is activated at any time, and the batteries 200, BAT #1-#4 are arranged to preclude leakage loops between batteries. As the self-drain of the Li—$SOCl_2$ battery is miniscule, the multiple batteries 200, BAT #1-#4 effectively extend the service period between battery changes.

In accordance with features of the invention, the battery management function 118 is arranged to extend the service period between battery changes for the RFID) surveillance tag 100. With the RFID surveillance tag 100 including four A-size Li—$SOCl_2$ batteries, with only one battery is activated at any time. The battery management function 118 monitors a current battery being activated and used to supply power to the tag 100. The battery management function 118 automatically switches to a next battery when the current battery is discharged.

The battery management function 118 of the radio frequency identification (RFID) surveillance tag 100 includes a respective diode 202 connected between a respective positive terminal of the multiple batteries 200, BAT #1-#4 and a positive voltage supply rail Vout. A capacitor 203 is connected between the positive voltage supply rail Vout and ground potential. A four-way multiplexer (MUX) 204 receives four inputs of the respective positive terminal of the multiple batteries 200, BAT #1-#4 and providing a selected battery output OUT applied to a positive terminal of a power supply connector 206. The battery management function 118 includes a low power voltage reference generator 208 with a bias circuit formed by capacitor C2, and a pair of resistors R1, R2 providing an input to an operational amplifier 210 and an input to an AND gate 212 connected to the output of the operational amplifier 210. A output of AND gate 212 is coupled by a bias circuit formed by a resistor R3, a capacitor C4, and an inverter 214 and applied to applied to a second input to the AND gate 212. The output of multiplexer 204 is applied to a second input to the operational amplifier 210 via a resistor R4. A pair of logic D-output gates 216, 218 receive the output of AND gate 212, and provide respective selection inputs to the four-way multiplexer (MUX) 204 for sequentially selecting the battery of the multiple batteries 200, BAT #1-#4 to be used.

It should be understood that the present invention is not limited to the illustrated arrangement of the battery management function 118. Various other circuit implementations could be used to provide the battery management function 118.

FIG. 3 illustrates not to scale an example radio frequency identification (RFID) surveillance tag 100 of FIG. 1 mounted on an associated packaging or drum 302, for example, containing radioactive and fissile materials in accordance with the preferred embodiment. A back plate 304 is used to mount the seal sensor 124 to the associated packaging or drum 302. The tag body 120 is shown mounted onto the back plate 304. The drum 302, for example, is a 35-gallon drum with a bolted closure lid, used for storage and transportation of fissile and radioactive materials.

The RFID surveillance tag 100 can be attached onto the drum 302 by two bolts, as shown in FIG. 3. In operation, if either of the bolts is loosened, the seal sensor 124 triggers an alarm. RFID surveillance tag 100 sends the alarm to the reader 140 immediately and record the event in the tag memory 108. The software of host computer 142 shows the alarm on the computer screen, and sends the alarm to a central station (not shown) for action.

Figure 4:
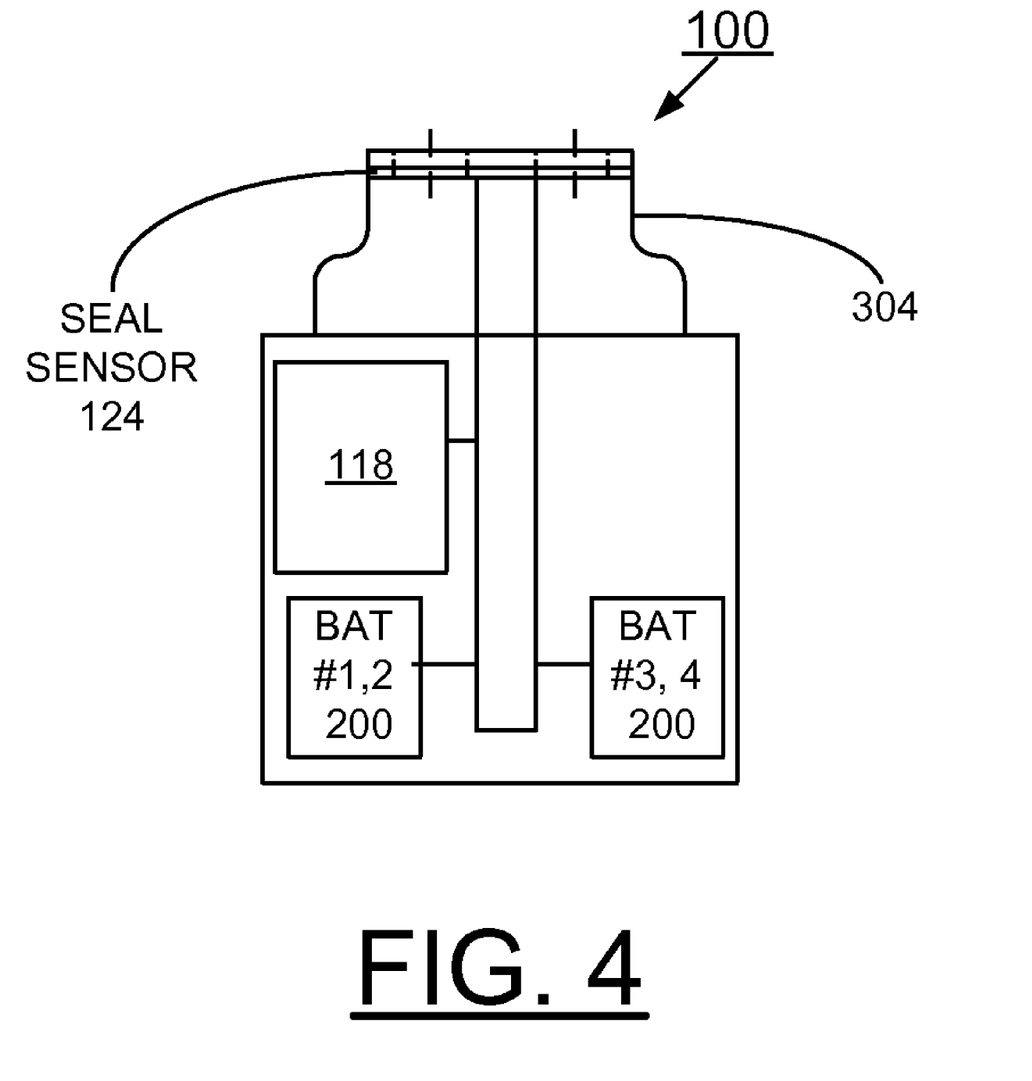
FIG. 4 schematically illustrates the exemplary radio frequency identification (RFID) surveillance tag of FIG. 3 with a metal back plate removed illustrating interior details in accordance with the preferred embodiment.

FIG. 4 schematically illustrates the exemplary radio frequency identification (RFID) surveillance tag 100 of FIG. 3 with a metal back plate 304 removed illustrating interior details of the RFID tag 100.

As shown in FIGS. 3 and 4, the back plate 304 includes a predefined shape selectively provided for mounting with the associated packaging 302 and the tag body 120 includes a universal form for use with multiple different types of the associated packaging. A selected configuration of the back plate 304 enables simple modifications to provide different configurations and packagings. To reduce the likelihood of unintentional bumping and impact during handling of drums, the RFID surveillance tag 100 has a slim profile that fits within the footprint of a drum cover of the associated packaging 302

In accordance with features of the invention, the overall form factor of the RFID surveillance tag 100 is designed to be universal for drum-type packaging, so that only the supporting back plate 304 and seal sensor 124 need to be customized for bolt attachments.

Figure 5:
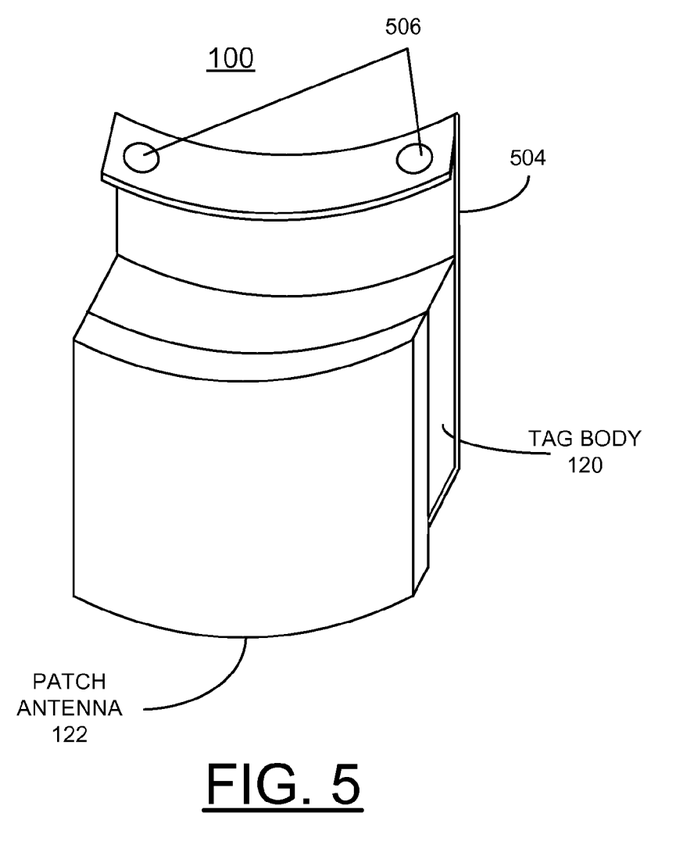
FIG. 5 schematically illustrates not to scale another example radio frequency identification (RFID) surveillance tag of FIG. 1 in accordance with the preferred embodiment.
Figure 6:
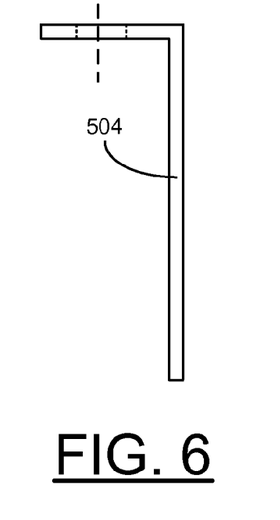
FIG. 6 illustrates an exemplary metal back plate of the radio frequency identification (RFID) surveillance tag of FIG. 5 in accordance with the preferred embodiment.

Referring now to FIGS. 5 and 6, there is shown another example radio frequency identification (RFID) surveillance tag 100 of FIG. 1 in accordance with the preferred embodiment. In FIG. 5, an example patch antenna 122 and another example back plate 504 are shown, each mounted to the tag body 120. The back plate 504 has an overall L-shape and includes a pair of holes 506 for receiving flange bolts mounting the seal sensor (not shown) with the associated packaging or drum (not shown). FIG. 6 provides a side view of the metal back plate 504 of the radio frequency identification (RFID) surveillance tag 100.

Figure 7:
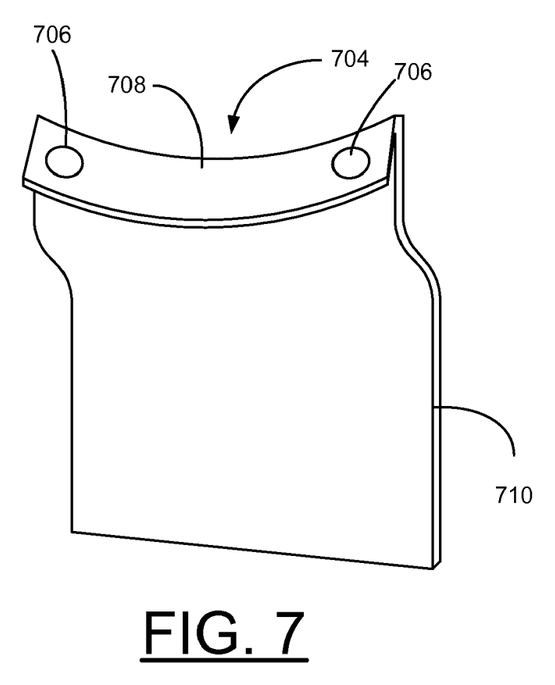
FIGS. 7 and 8 are front and side views schematically illustrating another exemplary metal back plate of the radio frequency identification (RFID) surveillance tag of FIG. 3 in accordance with the preferred embodiment.
Figure 8:
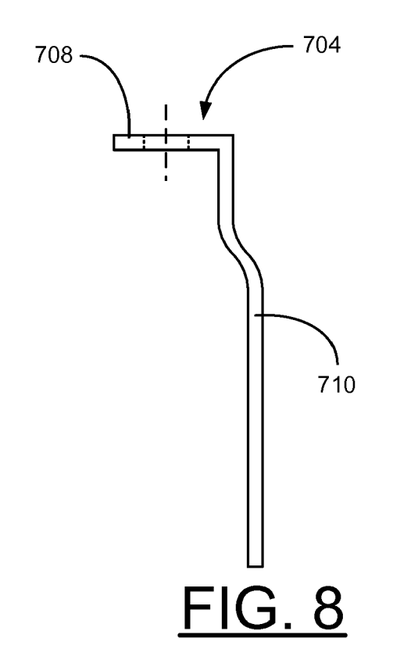

Referring now to FIGS. 7 and 8, there is shown another exemplary metal back plate 704 of the radio frequency identification (RFID) surveillance tag 100 in accordance with the preferred embodiment. The back plate 704 has a upper L-shape includes a pair of holes 706 in an upper flange 708 for receiving flange bolts mounting the seal sensor (not shown) with the associated packaging or drum (not shown) and a lower portion 710. FIG. 8 provides a side view of the metal back plate 704 of the radio frequency identification (RFID) surveillance tag 100.

Figure 9:
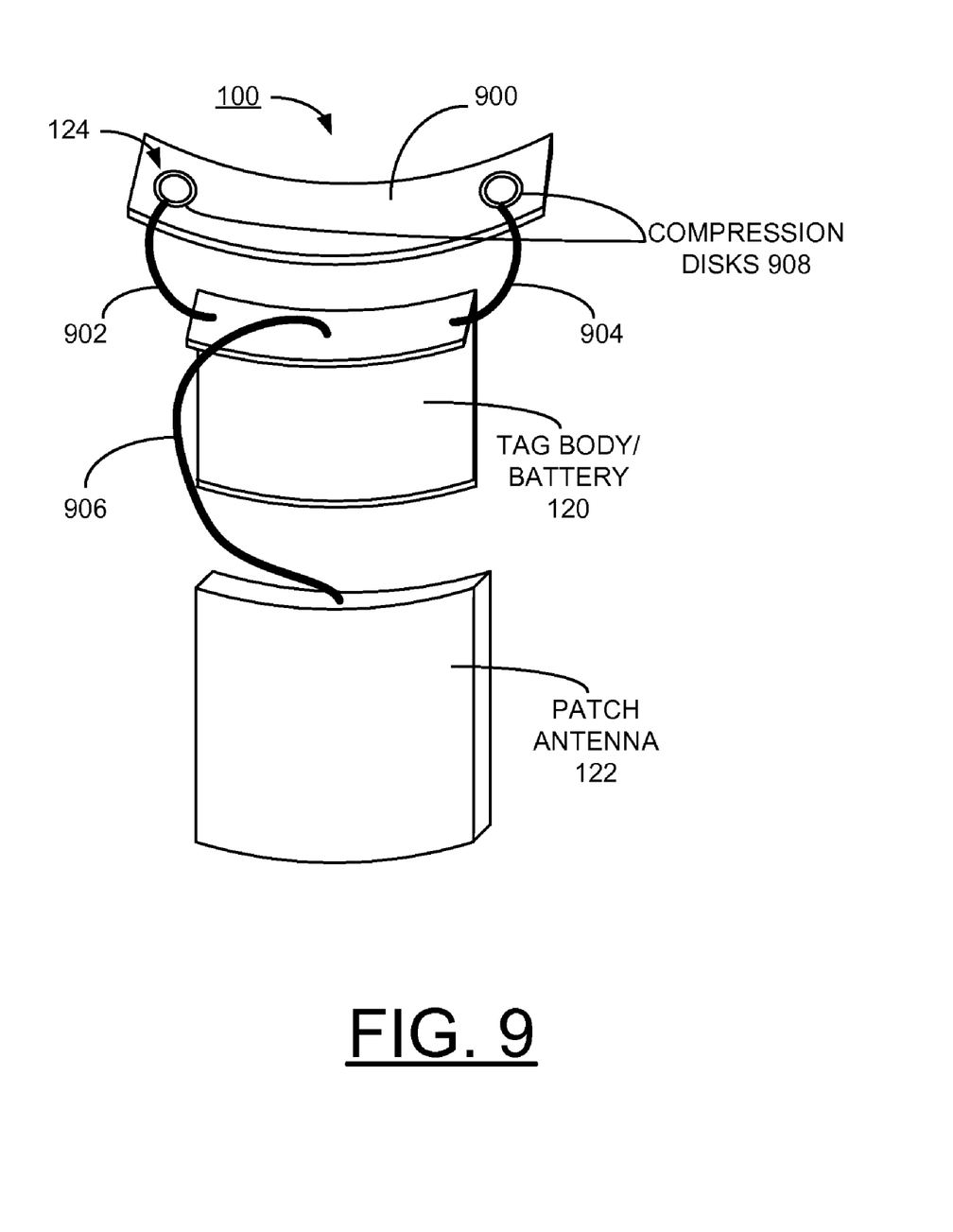
FIG. 9 schematically illustrates not to scale another example radio frequency identification (RFID) surveillance tag of FIG. 1 in accordance with the preferred embodiment.

FIG. 9 schematically illustrates not to scale another example radio frequency identification (RFID) surveillance tag 100 in accordance with the preferred embodiment. In FIG. 9, an example patch antenna 122 and another example flange plate 900 are shown with cables 902, 904, 906 respectively connecting a pair of compressive discs 908 of the seal sensor 124 and the patch antenna 122 to the tag body 120.

In brief summary, significant benefits result with the application of the multi-functional RFID surveillance tags 100 in nuclear materials management including enhanced safety via continuous monitoring of the environmental conditions, lower radiation exposure to workers due to reduced need for manned surveillance, real-time access of status and history data, and enhanced security via continuous monitoring of location and movement.

While the present invention has been described with reference to the details of the embodiments of the invention shown in the drawing, these details are not intended to limit the scope of the invention as claimed in the appended claims.

What is claimed is:

1. A radio frequency identification (RFID) surveillance tag for use with an associated packaging comprising:
   a tag body;
   a back plate coupled to said tag body, said back plate including predefined mounting features for mounting to the associated packaging;
   a battery power supply;
   a plurality of sensors monitoring the associated packaging, said plurality of sensors including a seal sensor;
   a respective control logic function coupled to said plurality of sensors including said seal sensor and said battery power supply;
   said seal sensor including a force sensitive material providing a resistivity change responsive to change in a seal integrity change of the associated packaging; and said respective control logic function coupled to said seal sensor responsive to said resistivity change, generating a seal integrity tag alarm; and
   a sensor memory storing each said generated seal integrity tag alarm.

2. The radio frequency identification (RFID) surveillance tag as recited in claim 1 wherein the RFID surveillance tag is adapted for extended use in an environment of radioactive and fissile materials.

3. The radio frequency identification (RFID) surveillance tag as recited in claim 1 wherein said seal sensor includes passive components, and operation of said seal sensor exerts substantially no load on the battery power supply.

4. The radio frequency identification (RFID) surveillance tag as recited in claim 1 wherein said tag memory is nonvolatile, whereby data in said sensor memory is maintained with a low-battery state.

5. The radio frequency identification (RFID) surveillance tag as recited in claim 1 wherein said plurality of sensors includes a low battery status sensor, said low battery status sensor triggering a warning responsive to a low-battery state.

6. The radio frequency identification (RFID) surveillance tag as recited in claim 1 wherein said battery power supply includes multiple batteries.

7. The radio frequency identification (RFID) surveillance tag as recited in claim 1 wherein said battery power supply includes multiple Li—SOCl$_2$ batteries.

8. The radio frequency identification (RFID) surveillance tag as recited in claim 1 wherein said battery power supply includes multiple batteries, and only one battery of said multiple batteries being activated at a time.

9. The radio frequency identification (RFID) surveillance tag as recited in claim 1 includes a battery management function and wherein said battery power supply includes multiple batteries, and said battery management function monitors a current battery being used, and automatically switches to a next battery when the current battery is discharged.

10. The radio frequency identification (RFID) surveillance tag as recited in claim 1 wherein said back plate includes a predefined shape selectively provided for mounting with the associated packaging.

11. The radio frequency identification (RFID) surveillance tag as recited in claim 10 wherein said selected shape of said back plate enables simple modifications for different packagings.

12. The radio frequency identification (RFID) surveillance tag as recited in claim 1 wherein said tag body includes a universal form for use with multiple different types of the associated packaging.

13. The radio frequency identification (RFID) surveillance tag as recited in claim 1 wherein said tag body has a predefined profile to fit within a diameter of a drum cover of the associated packaging.

14. The radio frequency identification (RFID) surveillance tag as recited in claim 1 further includes a central processor unit.

15. The radio frequency identification (RFID) surveillance tag as recited in claim 1 further includes a system memory coupled to said central processor unit.

16. The radio frequency identification (RFID) surveillance tag as recited in claim 1 further includes a user memory coupled to said central processor unit.

17. The radio frequency identification (RFID) surveillance tag as recited in claim 1 wherein said plurality of sensors includes a radiation dosimeter sensor.

18. A method for tracking and managing a plurality of packagings containing radioactive and fissile materials comprising:

providing a radio frequency identification (RFID) surveillance tag with an associated packaging of the plurality of packagings;

providing said RFID surveillance tag with a tag body and a back plate including predefined mounting features for mounting the surveillance tag to the associated packaging; said RFID surveillance tag including a battery power supply; said RFID surveillance tag including a plurality of sensors monitoring the associated packaging including a seal sensor; said seal sensor includes a force sensitive material providing a resistivity change responsive to a seal integrity change of the associated packaging;

said RFID surveillance tag generating a seal integrity tag alarm responsive to said resistivity change and including a sensor memory storing each said generated seal integrity tag alarm.

19. The method for tracking and managing a plurality of packagings containing radioactive and fissile materials as recited in claim 18 includes providing nonvolatile sensor memory to maintain data stored in said sensor memory with a low-battery state.

20. The method for tracking and managing a plurality of packagings containing radioactive and fissile materials as recited in claim 18 providing a plurality of batteries defining said battery power supply; and activating only one battery at a time and monitoring a current battery being used, and automatically switching to a next battery when said current battery is discharged.

* * * * *